United States Patent Office 2,849,487
Patented Aug. 26, 1958

2,849,487

N,N'-ALKANEDIYLIDENEBIS (BICYCLOHEXYL)-4-AMINES

Harry F. Brust, Midland, Mich., assignor to The Dow Chemical Company, Midland, Mich., a corporation of Delaware No Drawing. Application May 6, 1957
Serial No. 657,045

3 Claims. (Cl. 260—566)

The present invention relates to N,N'-alkanediylidenebis [(bicyclohexyl)-4-amines] having the formula

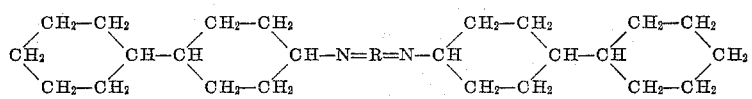

wherein R represents an alkanediylidene radical containing from 2 to 4 carbon atoms, inclusive. These compounds are crystalline solids somewhat soluble in many organic solvents and substantially insoluble in water. They have been found to be useful as parasiticides and are adapted to be employed as active toxic constituents in dust and spray compositions for the control of many organisms such as bacteria, fungi and nematodes. The compounds are also useful as herbicides for the control of the growth of plants.

The new compounds may be prepared by causing (bicyclohexyl)-4-amine to react portionwise with a dialdehyde having the formula

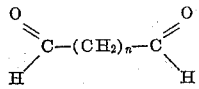

wherein $n$ represents one of the numbers 0, 1 and 2. The reaction is carried out in the presence of an inert organic solvent such as methanol, ethanol or diethyl ether. Good results are obtained when at least two molecular proportions of the (bicyclohexyl)-4-amine are reacted with one molecular proportion of the dialdehyde. The reaction is somewhat exothermic and takes place smoothly within the temperature range of from about —10° to about 70° C. with the formation of the desired product and water of reaction. The temperature may be controlled by regulating the rate of contacting the reactants as well as by external cooling. Upon completion of the reaction, the desired product is separated in conventional fashion.

In carrying out the reaction, the (bicyclohexyl)-4-amine is contacted portionwise with the dialdehyde in the reaction solvent and in the contacting temperature range. During the reaction, the desired product oftentimes precipitates in the reaction mixture as a crystalline solid. Upon completion of the reaction, the reaction mixture may be cooled to precipitate the desired product or to precipitate additional product. The precipitated product conveniently may be separated by filtration and thereafter purified by recrystallization from suitable organic solvents.

The (bicyclohexyl)-4-amine employed as a starting material in the present invention occurs in two isomeric forms known as the alpha and beta isomers. These two isomers may be prepared by known methods. In such methods, 4-cyclohexylcyclohexanol is dehydrogenated over a copper catalyst at 300° C. to form 4-cyclohexylcyclohexanone, and this product thereafter ammoniated to form a 4-cyclohexylcyclohexanone imine. The latter is thereafter hydrogenated over a nickel catalyst at 60° C. and 75 pounds pressure per square inch to give a reaction mixture containing about equal amounts of the alpha and beta isomers of (bicyclohexyl)-4-amine. The hydrogen chloride salt of the beta isomer of the amine is soluble in chloroform while the hydrogen chloride salt of the alpha isomer of the amine is substantially insoluble in chloroform. Thus, the isomeric amines may be separated in the form of their hydrogen chloride salts, and the salts thereafter converted to the free amine. The hydrogen chloride salts of the alpha and beta isomers of the amine melt at 295°–300° C. and 228°–232° C., respectively, while the alpha isomer of the amine melts at 58°–62° C. and the beta isomer of the amine melts at 32° C.

The following examples illustrate the invention but are not to be construed as limiting:

*Example 1.—N,N'-ethanediylidenebis [(bicyclohexyl)-4-amine] α-isomer*

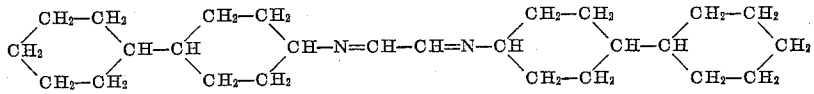

Glyoxal (5.8 grams; 0.102 mole) in 7.1 milliliters of water was dissolved in 50 milliliters of ethanol and the resulting solution added portionwise with stirring over a period of about 15 minutes to 20.0 grams (0.115 mole) of (bicyclohexyl)-4-amine α-isomer dissolved in 750 milliliters of ether. The addition was carried out with stirring and cooling and at a temperature of from 30° to 35° C. During the addition, a crystalline solid precipitated in the reaction mixture. Upon completion of the reaction, the solid which had formed was separated by filtration. As a result of these operations, there was obtained an N,N'-ethanediylidenebis [(bicyclohexyl)-4-amine] α-isomer product which after recrystallization from benzene was found to melt at 185°–186° C. This product had a nitrogen content of 7.04 percent compared to the calculated value of 7.27 percent.

*Example 2.—N,N'-propanediylidenebis [(bicyclohexyl)-4-amine] α-amine*

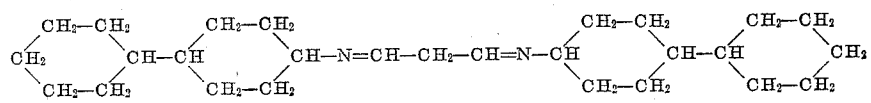

Malonaldehyde (0.115 mole, 8.25 grams) is dissolved in 100 milliliters of ethanol and the resulting solution added portionwise with stirring to a solution of 40 grams (0.23 mole) of (bicyclohexyl)-4-amine α-isomer dissolved in 600 milliliters of ether. The addition is carried out over a period of 30 minutes and at a temperature of from 25° to 35° C. Upon completion of the reaction, the solid which precipitates is filtered, dried and recrystallized from toluene. As a result of these operations, there is obtained and N,N'-propanediylidenebis [(bicyclohexyl)-4-amine] α-isomer product as a white crystalline solid. N,N'-propanediylidenebis [(bicyclohexyl)-4-amine] α-isomer has a molecular weight of 398.

*Example 3.—N,N'-butanediylidenebis [(bicyclohexyl)-4-amine] α-isomer*

A solution of succinaldehyde (0.125 mole, 10.7 grams) in 150 milliliters of ethanol is added slowly portionwise with stirring to a solution of 45.5 grams (0.25 mole) of bicyclohexyl-4-amine α-isomer in 500 milliliters of ether. The addition is carried out as described in the previous example. The solid which forms in the reaction mixture is separated by filtration, dried and recrystallized from benzene. N,N'-butanediylidenebis [(bicyclohexyl)-4-amine] α-isomer has a molecular weight of 412.

In a similar manner, the β-isomers of N,N'-ethanediylidenebis [(bicyclohexyl)-4-amine], N,N'-propanediylidenebis [(bicyclohexyl)-4-amine] and N,N'-butanediylidenebis [(bicyclohexyl)-4-amine] may be prepared by the reaction of (bicyclohexyl)-4-amine β-isomer with glyoxal, malonaldehyde and succinaldehyde, respectively.

The new compounds of the present invention have been tested and found to be effective as herbicides and parasiticides. For such use, the products may be dispersed on an inert finely divided solid and employed as dusts. Also such mixtures may be dispersed in water with the aid of a wetting agent and the resulting aqueous suspensions employed as sprays. In other procedures, the products may be employed as constituents of oil-in-water emulsions or water dispersions with or without the addition of wetting, dispersing or emulsifying agents. In representative operations, N,N'-ethanediylidenebis [(bicyclohexyl)-4-amine] α-isomer was dispersed in an aqueous suspension of root-knot nematode larvae in an amount sufficient to supply 10 parts by weight of the toxicant compound per million parts of aqueous suspension. After six days the treated suspension was examined and compared with an untreated check suspension to determine the percent control of nematodes. The observations showed that N,N'-ethanediylidene [(bicyclohexyl)-4-amine] α-isomer gave a substantially complete control of root-knot nematodes.

I claim:

1. An N,N'-alkanediylidenebis [(bicyclohexyl)-4-amine] having the formula

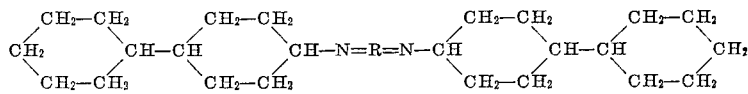

wherein R represents a alkanediylidene radical containing from 2 to 4 carbon atoms, inclusive.

2. N,N'-ethanediylidenebis [(bicyclohexyl)-4-amine] α-isomer.

3. A process for the preparation of an N,N'-alkanediylidenebis [(bicyclohexyl)-4-amine] having the formula

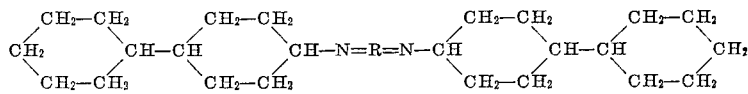

wherein R represents an alkanediylidene radical containing from 2 to 4 carbon atoms, inclusive, which comprises the step of reacting at least two molecular proportions of (bicyclohexyl)-4-amine with one molecular proportion of a dialdehyde selected from the group consisting of glyoxal, malonaldehyde and succinaldehyde.

No references cited.